M. B. RYAN.
MACHINE FOR ELECTRICALLY WELDING THE LINKS OF CHAINS, RINGS, OR THE LIKE.
APPLICATION FILED JAN. 29, 1914.
1,150,150.
Patented Aug. 17, 1915.
2 SHEETS—SHEET 1.
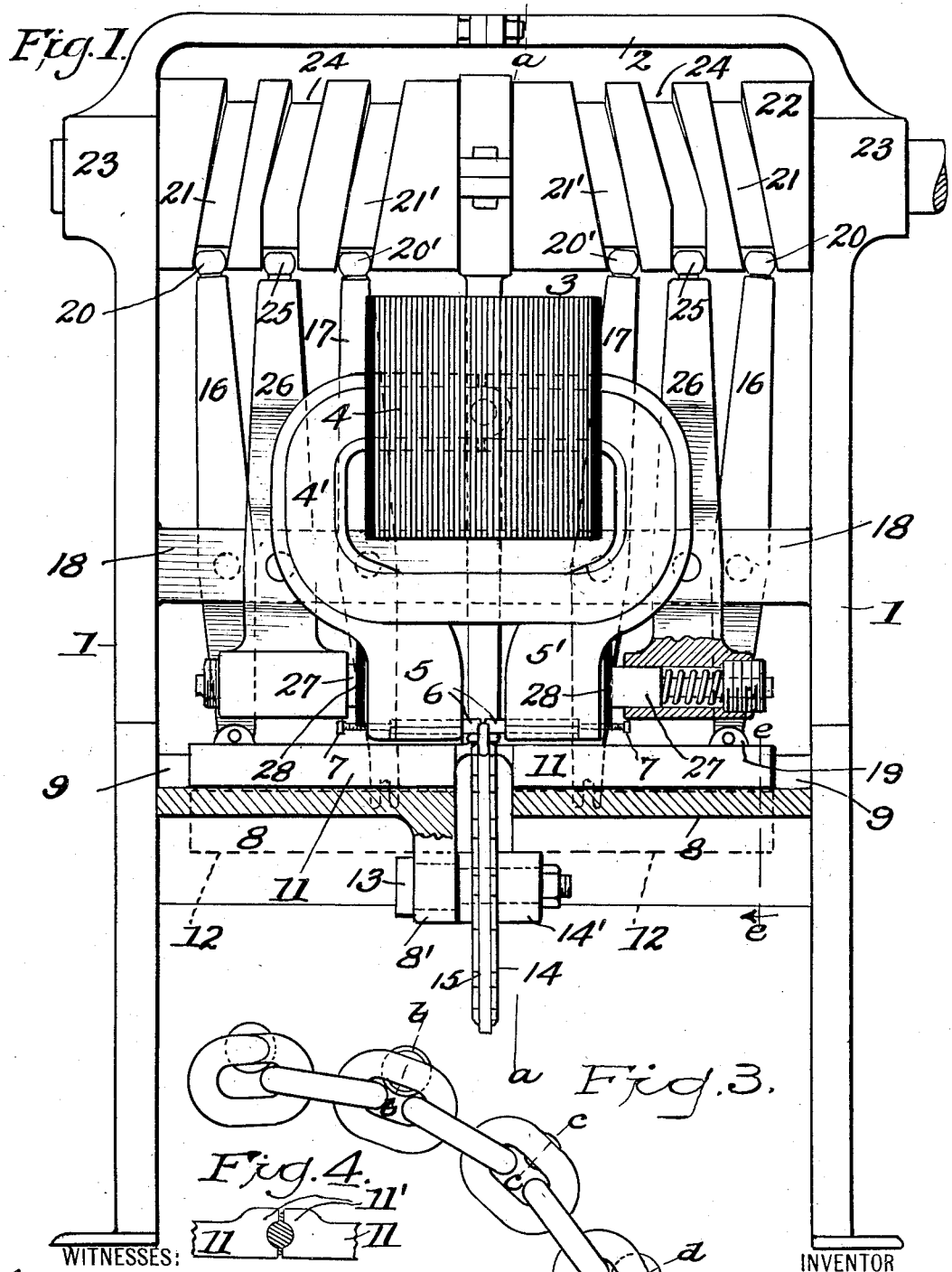

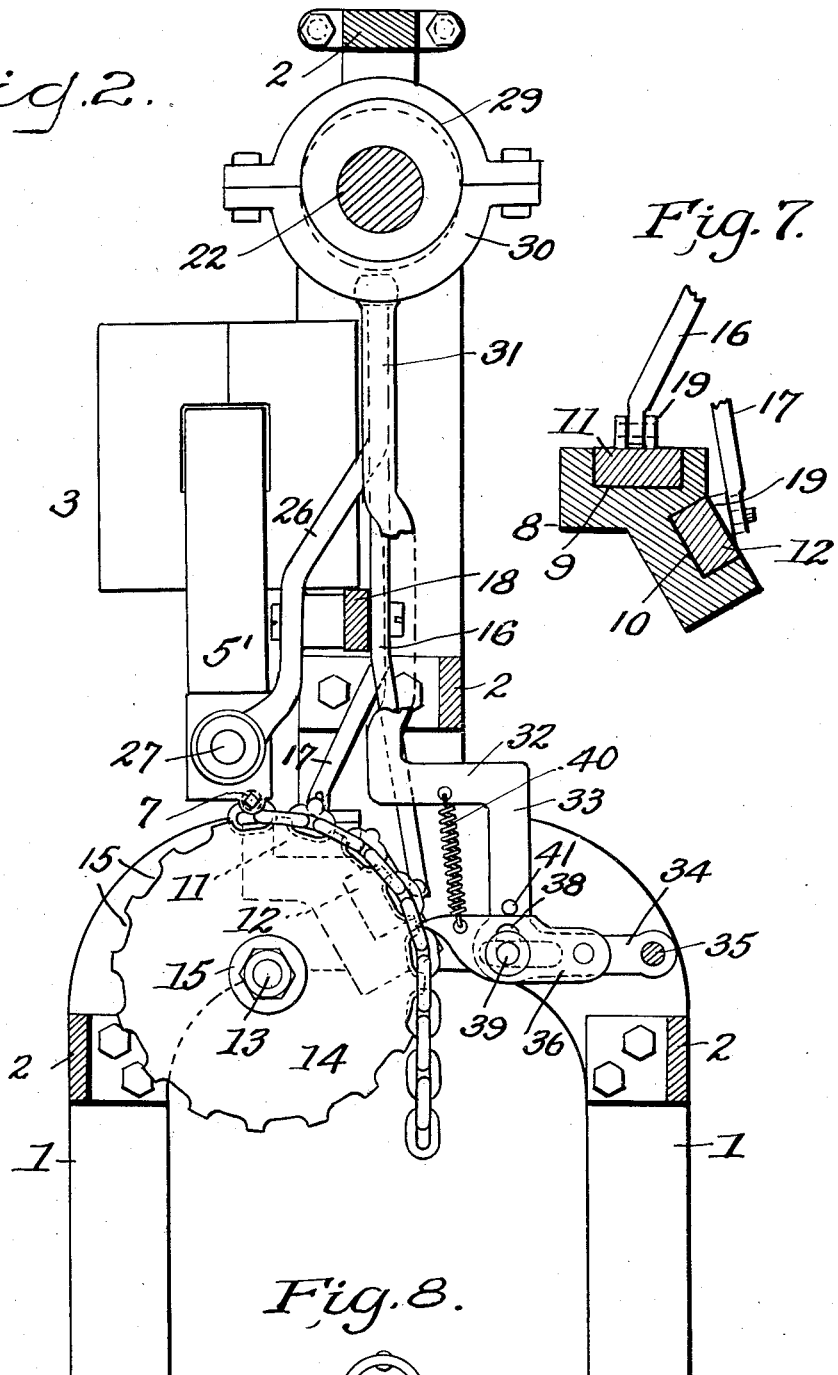

UNITED STATES PATENT OFFICE.

MICHAEL BARTHOLOMEW RYAN, OF BRIDGEPORT, CONNECTICUT.

MACHINE FOR ELECTRICALLY WELDING THE LINKS OF CHAINS, RINGS, OR THE LIKE.

1,150,150.      Specification of Letters Patent.    Patented Aug. 17, 1915.

Application filed January 29, 1914. Serial No. 815,210.

*To all whom it may concern:*

Be it known that I, MICHAEL B. RYAN, a citizen of the United States, and a resident of Bridgeport, in the county of Fairfield and State of Connecticut, have invented a certain new and useful Improvement in Machines for Electrically Welding the Links of Chains, Rings, or the like, of which the following is a specification.

The object of the invention is to provide a simple and efficient automatically operating welding machine for welding lap-joints of chain links, rings, buckle-frames, and the like, shaping the welded sections so that they will conform to the diameter of the remaining section of the body, and finally in trimming off the rough surfaces left by the compressing and shaping tool.

The invention consists in first, heating the overlapping portions of a link, ring, or other body, by electrodes placed on opposite sides of the metal and in contact with the overlapping sections of each end thereof, then withdrawing the electrodes and moving the heated section of the body into position to be engaged by compressing and shaping jaws or dies which serve to press the highly heated surfaces of the ends of the body firmly together and into a solid mass or weld, at the same time shaping the metal at the weld so as to conform to the diameter of the remaining portions thereof, and finally, in cutting off the rough surfaces produced by the shaping jaws, thus leaving a smooth even surface at the weld. The invention further consists in providing means for feeding the material through the machine, and in means operated by a single drive shaft, for effecting the various operations above recited as will be hereinafter full described and then claimed.

In the drawings, illustrating the invention, in the several figures of which like parts are similarly designated, Figure 1 is a front view of the machine partly in section to illustrate one of the details of construction. Fig. 2 is a vertical transverse section drawn on the line *a—a* of Fig. 1, the transformer being shown in elevation. Fig. 3 is a diagrammatic side view on a larger scale of a section of a chain illustrating the various operations on the links as they are passed through the machine. Figs. 4, 5 and 6, are transverse sections drawn, respectively, on the lines *b—b*, *c—c*, and *d—d* of Fig. 3. Fig. 7 is a transverse section drawn on the line *e—e* of Fig. 1, illustrating the mounting of the slides carrying the shaping and cutting jaws of the machine. Fig. 8 is a side elevation partly in section of a portion of a ring holding disk used in connection with the machine.

The sides 1 of the machine are connected together by cross braces 2, and mounted between the sides is a transformer 3 of usual construction comprising the laminated core plates 4, primary coil 4' and secondary members 5 and 5', the latter having sockets in their lower ends to receive short sections of trolley wires 6 which form the electrodes of the transformer. The electrodes are adjusted within their sockets by set screws 7 which serve to set the electrodes to suit the work passing through the machine and to take up the wear thereof as the abutting ends are burned off. Formed integral with, or connected to the sides 1 of the frame in suitable manner, are bed plates 8 which extend inwardly toward the center of the machine and provided with grooves 9 and 10 which provide guides for co-acting, compressing and shaping tools 11 and cutting or trimming tools 12 which are operated in the guides as will be presently explained. One of the bed plate sections 8 is formed at its inner end with a depending flange 8' that provides a support for a stud 13 upon which is mounted a guide wheel 14 having a hub 14' which is mounted on the stud 13. The periphery of the wheel 14 is recessed as at 15 to receive the links of a chain.

The tools 11 and 12 are in the nature of slides, and the inner ends of the slides 11 are formed with co-acting jaws or dies 11' having substantially semi-circular grooves of a shape to conform to the diameter of the link, ring or other body being operated upon when the abutting ends of the slide are brought together, and the inner or abutting ends of the slides 12 are formed with cutting jaws 12' and 12'', these jaws being likewise grooved to conform to the shape of the link. The recess in the jaw 12', is made deeper than that of the jaw 12'' so that as the jaws come together the cutting edges of the jaw 12' will lap over the horizontal center of the link or other body, to thus shear off the fins or other rough surfaces left by the compressing and shaping jaws, while the jaw 12'' serves as a brace to hold the link, ring or other body during the shearing action of the jaw 12'. The slides 11 and 12 are actuated by levers 16 and 17, respectively, which are pivoted intermediate their ends to a cross bar 18 connecting the side members 1 of the frame. The lower ends of the levers are preferably formed with open slots in which work pins or anti-friction rollers carried by lugs 19 extending from the said slides. The upper ends of the said levers are provided with anti-friction rollers 20 and 20', respectively, having spherical contacting surfaces which operate in cam grooves 21 and 21', respectively, formed in a cam shaft 22 mounted in bearings 23 at the upper ends of the sides of the frame. Between each groove 21 and 21' the shaft is formed with a groove 24 in which operates an anti-friction roller 25 carried at the upper end of a lever 26, each of which is pivoted intermediate its ends to the bar 18 and has its lower end formed with a circular bore in which is held a spring pressed pin 27 which bears against an insulating block 28 secured to the lower end of the secondary sections 5 and 5' of the transformer, which sections, it may be stated here, are pivoted together within the core plates in the usual manner. The purpose of providing the lower ends of the lever 26 with the spring pressed pins is to rovide additional movement for the electrodes after the lower ends of the secondary members of the transformer have been first thrown into engagement with the sides of the link by the action of the cams 24 to thereby permit the electrodes to "follow-up" the metal as it becomes hot, to thus constantly hold the overlapping ends thereof together.

Intermediate the cam grooves 21' the shaft 22 is formed with an eccentric 29 over which works an eccentric strap 30 having a downwardly extending eccentric rod 31 which is bent outwardly as at 32 and thence downwardly at 33 and outwardly at 34, the extreme end of the member 34 being journaled upon a shaft 35 carried by the side members 1 of the frame. To the arm 34 is pivoted the rear end of a pawl 36 whose forward end is shaped to fit into one of the links of the chain and to bear down upon the end of said link to feed the chain through the machine. By this arrangement it will be apparent that as the eccentric 29 operates to push the rod 31 downwardly the pawl 36 will likewise be pushed downwardly to thus rotate the wheel 14 and move the chain over the work field a distance of one link. Now in order to permit the return movement of the pawl 36, the elbow of the sections 33 and 34 of the rod 31 is formed with a slot 38 in which operates a pin 39 carried by the pawl 36 so that when the rod 31 has been moved to its extreme lowermost position, it will, on its return movement, be rocked on its pivot against the tension of the spring 40 to thereby permit its free end to slip over the links and be brought back into place the moment the free end of the pawl passes over the outer surfaces of the links. A stop pin 41 carried by the bar 31, serves to limit the return movement of the pawl and to cause it to move downwardly with rod 31 when it is operated.

The operation of the invention so far as described is as follows: We will assume that the links of a chain are to be welded and that one end of the chain has been placed in position upon the guide wheel 14 and that several links thereof have been finished. Now as the shaft 22 continues to rotate, and after one of the vertically positioned links of the chain has been adjusted into position between the electrodes of the transformer, the operating faces of the cam grooves 24 will engage the rollers 25 of the levers 26 to throw the upper ends of the said levers outwardly and their lower ends inwardly to push the lower ends of the secondary members of the transformer toward each other bers of the transformer toward each other to thus bring the electrodes into engagement with the ends of the link. This movement of the electrodes forces the beveled surfaces of the ends of the link into engagement with each other and closes the circuit through the transformer so that the electrodes will heat the link ends clear out to the sharp points thereof so that all of the metal about the joint will become thoroughly heated and softened, and in order to insure contact of the ends of the link as the metal softens and yields, I provide the lower ends of the levers with the spring actuated pins 27 which serve to push the lower ends of the secondary members of the transformer toward each other and to hold the electrodes into engagement with metal after the lower ends of the lever have been moved to their extreme inner position and the metal has lost its temper through being heated, it being understood, that when the levers 26 have been adjusted into operative position and the rollers 25 thereof will have reached a straight section in the cam, the latter will serve to hold the levers in their adjusted position until the said rollers are engaged by the operating faces of the cam to effect a reverse movement of the levers to withdraw the electrodes from the link before the next link is moved into position to be heated. Now during the time the one link is being heated the operating faces of the cams 21 will engage the rollers of the levers 16 to rock the latter to move the slides 11 toward each other, to thus force the jaws or dies thereof against the ends of the link to thus press the said ends tightly together and into a solid mass or weld. This action of the jaws or dies of the slides 11 also serves to shape the welded section of the link. However, as the dies are forced into engagement with the highly heated metal, a thin layer of the surplus metal will be forced up and caught between the upper and lower abutting surfaces of the jaws and thus leave a thin fin on the upper and lower sides of the link along the weld, and in order to remove these fins so as to produce a perfect link, I provide the cutting jaws or dies of the slides 12, as previously described. It will, of course, be understood, that the levers 17 are operated to move the slides into position in the same manner as described with reference to the levers 16. As it is desirable to allow the metal to cool off somewhat before the fins are sheared off to thus insure a smooth, clear cut, I so space the slides 12 from the slides 11 to allow one welded link to intervene between the jaws or dies of the said slides, so that sufficient time will have elapsed to allow the metal to cool between the welding and shaping operating on the link before the cutters come into play. It will thus be seen that simultaneously with the heating of a link, the previously heated link will be undergoing the operation of being welded and formed, and that the fins are also being removed from one of the other links. As the levers 16, 17 and 26 are operated to withdraw the electrodes and slides, respectively, away from the chain the eccentric 29 will operate the rod 31 to revolve the wheel 14 to bring the next vertically adjusted link into position to be acted upon by the electrodes and likewise to adjust the precedingly heated link opposite the pressing and shaping jaws or dies, and the link to be trimmed into position to be engaged by the cutters. As the several levers are operated, the eccentric 29 will elevate the rod 31 to thus adjust the pawl into position to engage one of the links in the chain to feed the latter forwardly during the next operation of the machine.

It will be noted that in welding the links of a chain with my present invention that only the vertically positioned links are operated upon as the chain passes through the machine, or in other words, every other link, so that as the last link of the chain has been welded and finished it will be necessary to again pass the chain through the machine to thus weld the remaining links. However, this is not a serious objection or disadvantage, as it will be understood that but little time is lost in placing the chain in the machine.

My invention will be found particularly applicable in the making of short chains and especially those used on harness and for other purposes where chains of from six to twelve links are used, and a great saving would be made thereby since, at the present time, it is the practice to cut long chains into the lengths desired which means a loss of one link in every short chain used.

While I have shown and described my invention as being applicable for the welding of chain links, I do not want it to be understood as being restricted to this use, as the invention will be found of equal advantage in the welding of rings, belt buckles, and the like, and for this purpose I detachably mount the guide wheel 14 on its stud so that the wheel 14 for guiding one size of chain may be readily replaced by another for a different size of chain, and likewise that a wheel for holding rings such as is shown in Fig. 8, or for holding various shapes and sizes of belt buckles or the like, may be readily inserted in the machine when rings or the like are to be welded. It will be understood, however, that in the welding of rings or belt buckles the operation of the machine is exactly the same as that described with reference to the welding of chains.

What I claim is:

1. In an electrical welding machine, a frame, a rotatable chain carrying guide detachably mounted thereon, a transformer carrying adjustable electrodes adapted for heating the ends of the metal to be welded, means for feeding the work through the machine step by step, co-acting compressing and shaping jaws, co-acting cutting jaws, independent means for operating said jaws, and means for actuating said operating means.

2. In an electrical welding machine, a main frame, a rotatable guide detachably mounted on the frame, a transformer having adjustable electrodes for heating the ends of the metal to be welded, means for moving the electrodes into and out of engagement with the metal, co-acting jaws adapted to compress the heated metal into a solid mass or weld and to shape the weld, cutting jaws for shearing the projections from the weld that are produced by the compressing and shaping jaws, means for operating said jaws, and means for feeding the work through the machine.

3. In an electrical welding machine, a main frame, a rotatable chain carrying guide detachably mounted on the frame, a transformer carrying adjustable electrodes arranged to move into and out of engagement with the ends of the metal to be heated, co-acting jaws for compressing the heated metal into a solid mass or weld and for shaping the weld, co-acting cutting jaws for shearing the projections along the weld produced by the compressing and shaping jaws, means for actuating said compressing and shaping jaws and cutting jaws, and means for intermittently rotating said guide wheel to feed the work through the machine.

4. In an electrical welding machine, the combination with a main frame, of a rotatable guide wheel detachably mounted in the frame, a transformer carrying electrodes arranged to be moved into and out of engagement with the overlapping ends of the metal to be welded, co-acting jaws or dies for compressing the overlapping heated ends of the metal into a solid body or weld, said jaws serving to shape the joint as specified, co-acting cutting jaws for shearing the projections from the metal produced by the compressing and shaping jaws, and means for moving the work through the machine step by step and into position to be acted upon by said electrodes and said jaws.

5. In an electrical welding machine, the combination with a main frame, of a rotatable guide wheel mounted in the frame for supporting the work passing through the machine, means for intermittently rotating the wheel, a transformer carrying electrodes arranged to be moved into and out of engagement with the overlapping ends of the metal, slides having co-acting jaws for compressing the overlapping heated ends of the metal into a solid body or weld, a second set of slides having co-acting cutting jaws for trimming the projections from the welded joint produced by the compressing jaws, levers for actuating said slides and a shaft having cam grooves for operating said levers.

6. In an electrical welding machine, the combination with a main frame, of a rotatable work-carrying guide wheel detachably mounted in the frame, a transformer carrying electrodes arranged to be moved into and out of engagement with the overlapping ends of the metal to be welded, slides having co-acting jaws for compressing the overlapping heated ends of the metal into a solid body or weld, levers for actuating the slides, a second set of slides having co-acting cutting jaws for trimming the projections from the welded joint produced by the compressing jaws, and a shaft having cam grooves for operating said levers, a pawl engaging the work carried by said guide wheel, an eccentric formed on said cam shaft, and an eccentric strap operatively connected with said pawl for rotating the work wheel substantially as specified.

7. In an electrical chain welding machine, the combination with a frame, of a detachable chain carrying guide for supporting the work passing through the machine, means for feeding the work through the machine step by step, a transformer carrying electrodes arranged for engagement with the overlapping ends of the metal to be welded, co-acting jaws for compressing and shaping the heated metal for the purpose specified, jaws having co-acting cutting surfaces for trimming the projections from the welded joint produced by the compressing jaws, and means for moving the jaws into engagement with the work.

8. In an electrical chain welding machine, the combination with a frame, of a rotatable chain carrying guide for the work passing through the machine, means for feeding the work through the machine step by step, a transformer carrying electrodes for heating the ends of the metal to be welded, co-acting jaws for compressing the heated metal into a solid body or weld and for shaping the welded joint, co-acting cutting jaws and means for operating said jaws.

In testimony whereof I have hereunto set my hand this 28 day of January, A. D. 1914.

MICHAEL BARTHOLOMEW RYAN.

Witnesses:
MARY E. LYDDY,
HARRY S. HENLY.